US012206179B2

(12) United States Patent
Komura

(10) Patent No.: US 12,206,179 B2
(45) Date of Patent: Jan. 21, 2025

(54) ANTENNA MODULE AND COMMUNICATION DEVICE EQUIPPED WITH THE SAME

(71) Applicant: Murata Manufacturing Co., Ltd., Nagaokakyo (JP)

(72) Inventor: Ryo Komura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 339 days.

(21) Appl. No.: 17/535,686

(22) Filed: Nov. 26, 2021

(65) Prior Publication Data

US 2022/0085521 A1 Mar. 17, 2022

Related U.S. Application Data

(63) Continuation of application No. PCT/JP2020/011696, filed on Mar. 17, 2020.

(30) Foreign Application Priority Data

May 27, 2019 (JP) ................................ 2019-098317

(51) Int. Cl.
*H01Q 15/24* (2006.01)
*H01Q 5/371* (2015.01)
(Continued)

(52) U.S. Cl.
CPC ............ *H01Q 21/28* (2013.01); *H01Q 5/371* (2015.01); *H01Q 15/24* (2013.01)

(58) Field of Classification Search
CPC ........ H01Q 21/28; H01Q 5/371; H01Q 15/24; H01Q 21/0025; H01Q 1/2283; H01Q 1/38; H01Q 21/065; H01Q 1/523; H01Q 23/00
See application file for complete search history.

(56) References Cited

U.S. PATENT DOCUMENTS

2019/0089047 A1* 3/2019 Hara ...................... H01Q 13/10
2020/0161749 A1* 5/2020 Onaka .................... H01Q 21/24
2021/0242596 A1* 8/2021 Komura ............... H01Q 9/0421

FOREIGN PATENT DOCUMENTS

JP 2001-94336 A 4/2001
JP 2003-347834 A 12/2003
(Continued)

OTHER PUBLICATIONS

Koriyama JP Patent Publication 2013046291A Machine Translation (Year: 2013).*
(Continued)

*Primary Examiner* — Hai V Tran
*Assistant Examiner* — Michael M Bouizza
(74) *Attorney, Agent, or Firm* — XSENSUS LLP

(57) ABSTRACT

An antenna module includes a radiation element including feeding elements adjacent to each other, a feed wiring, a ground electrode, and a filter circuit. The ground electrode is disposed to face the radiation element. The feed wiring transmits a radio frequency signal from an RFIC to the radiation element. The filter circuit is connected between a feed circuit and the feed wiring. The ground electrode includes a first portion facing the radiation element, and a second portion arranged in a layer at an upper side closer to the radiation element than the first portion. In plan view of the antenna module from a normal direction, i) the second portion is disposed between the two feeding elements, and ii) the filter circuit overlaps the second portion and is disposed in a layer at a lower side than the second portion.

20 Claims, 13 Drawing Sheets

(51) Int. Cl.
*H01Q 21/18* (2006.01)
*H01Q 21/28* (2006.01)

(56) References Cited

FOREIGN PATENT DOCUMENTS

| | | | |
|---|---|---|---|
| JP | 2004-221964 | A | 8/2004 |
| JP | 2013-46291 | A | 3/2013 |
| JP | 2019-57775 | A | 4/2019 |
| WO | 2019/026595 | A1 | 2/2019 |
| WO | 2019/054094 | A1 | 3/2019 |

OTHER PUBLICATIONS

Written Opinion of the International Searching Authority mailed on Jun. 30, 2020, received for PCT Application PCT/JP2020/011696, filed on Mar. 17, 2020, 4 pages. (Previously filed; submitting English translation only.).

International Search Report and Written Opinion mailed on Jun. 30, 2020, received for PCT Application PCT/JP2020/011696, filed on Mar. 17, 2020, 9 pages including English Translation.

* cited by examiner (a)

(b)

(a)

(b)

ANTENNA MODULE AND COMMUNICATION DEVICE EQUIPPED WITH THE SAME

CROSS-REFERENCE TO RELATED APPLICATIONS

The present application claims priority to Japanese patent application JP2019-098317, filed May 27, 2019, and PCT/JP2020/011696, filed Mar. 17, 2020, the entire contents of each of which being incorporated herein by reference.

TECHNICAL FIELD

The present disclosure relates to an antenna module and a communication device equipped with the antenna module, and more particularly, relates to a technique for improving characteristics of an antenna module including a circuit such as a filter in the same substrate as an antenna element.

BACKGROUND ART

Japanese Unexamined Patent Application Publication No. 2001-094336 (Patent Document 1) discloses a patch antenna with a built-in filter in which a radiation conductor (antenna element) and a filter are provided in the same base body made of a dielectric material. In the patch antenna with the built-in filter disclosed in Japanese Unexamined Patent Application Publication No. 2001-094336 (Patent Document 1), the filter is disposed such that at least a part of the filter overlaps a radiation electrode in plan view of the patch antenna.

CITATION LIST

Patent Document

Patent Document 1: Japanese Unexamined Patent Application Publication No. 2001-094336

SUMMARY

Technical Problems

Such an antenna may be applied to, for example, a communication terminal such as a mobile phone or a smartphone. In such a communication terminal, it is desired to reduce the size and thickness of the device.

As disclosed in Japanese Unexamined Patent Application Publication No. 2001-094336 (Patent Document 1), by disposing a circuit such as a filter in the same substrate as an antenna element (radiation element), it is possible to reduce the size of an entire antenna module. However, as recognized by the present inventor, when a height of the antenna module is further reduced, a distance between the radiation element and the circuit overlapping the radiation element is further shortened, and there is a possibility that deterioration in antenna characteristics such as causing a narrowing bandwidth.

In addition, when such a circuit is formed as a strip line, a distance between ground electrodes of the circuit becomes narrower as the height becomes lower, and the characteristics of the circuit itself may also be degraded.

The present disclosure has been made to solve the above-identified and other problems. In light of the above, an aspect of the present disclosure is to achieve a reduction in height of an antenna module including another circuit in the same substrate as a radiation element while suppressing deterioration of characteristics of an antenna.

Solutions

An antenna module according to the present disclosure includes a radiation element, a feed wiring, a first ground electrode, and a first circuit. The radiation element includes a first feeding element and a second feeding element adjacent to each other. The first ground electrode is disposed to face the radiation element. The feed wiring transmits a radio frequency signal from a feed circuit to the radiation element. The first circuit is connected between the feed circuit and the feed wiring. The first ground electrode includes a first portion facing the radiation element and a second portion disposed in a layer at an upper side closer to the radiation element than the first portion. In plan view of the antenna module from a normal direction with respect to a radiation side of the antenna module, i) the second portion is disposed between the first feeding element and the second feeding element, and ii) the first circuit overlaps the second portion and is disposed in a layer at a lower side than the second portion.

Advantageous Effects

According to an antenna module of the present disclosure, between two adjacent feeding elements, a part of the ground electrode (second portion) is disposed (raised) at the feeding element side, and a circuit (first circuit) is disposed below the raised portion. Since the first circuit does not overlap the two feeding elements in plan view of the antenna module, the influence of the first circuit on the antenna characteristics when the height is reduced is reduced. In addition, even when the height is reduced, a space for disposing the first circuit can be ensured, and thus, it is possible to suppress a reduction in characteristics of the first circuit.

DESCRIPTION OF EMBODIMENTS

Figure 1:
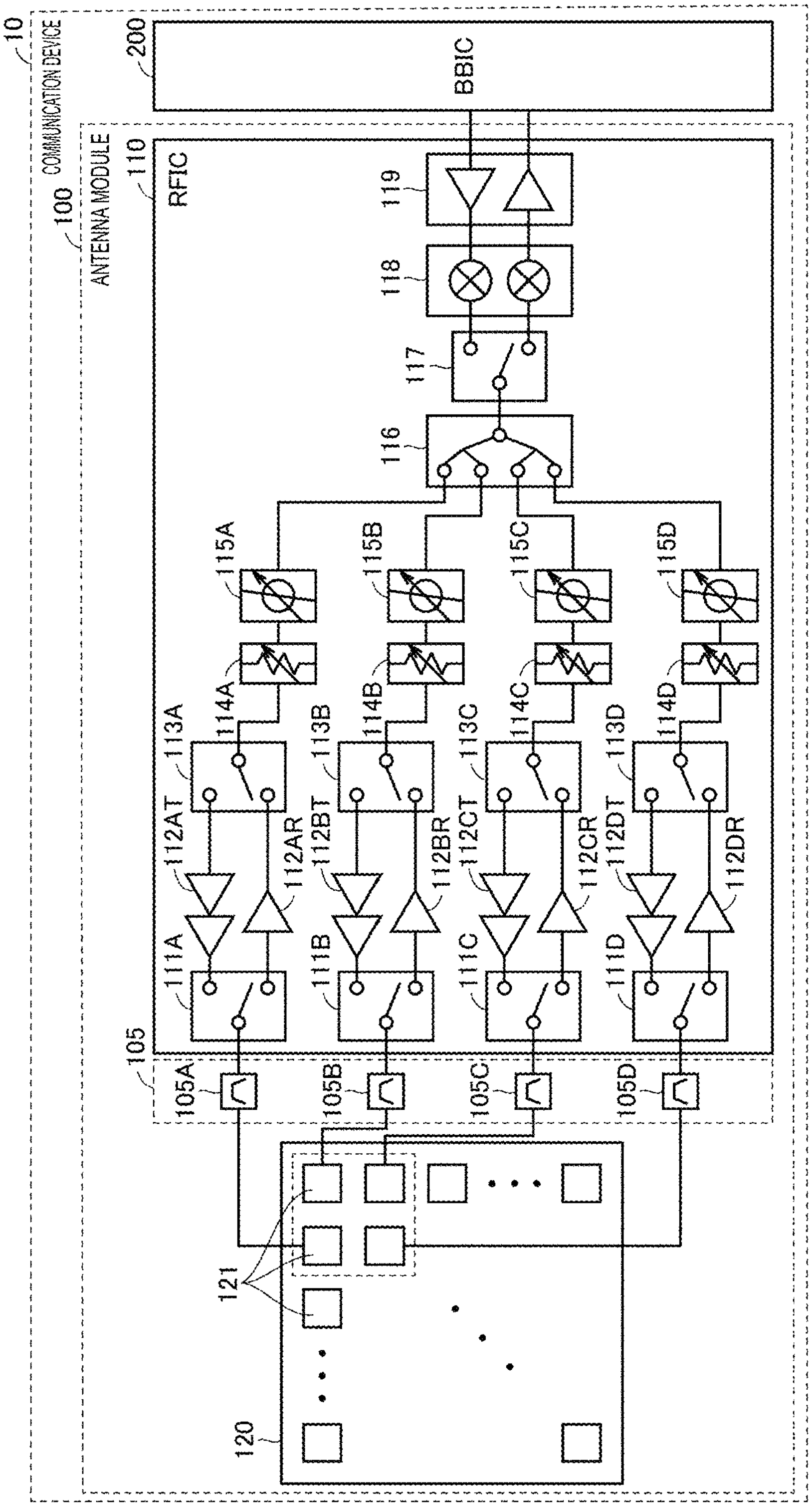
FIG. 1 is a block diagram of a communication device to which an antenna module according to Embodiment 1 is applied.

Hereinafter, embodiments of the present disclosure will be described in detail with reference to the drawings. Note that, in the drawings, the same or corresponding portions are denoted by the same reference signs, and description thereof will not be repeated.

Embodiment 1

(Basic Configuration of Communication Device) FIG. 1 is an example of a block diagram of a communication device 10 to which an antenna module 100 according to Embodiment 1 is applied. The communication device 10 is, for example, a mobile terminal such as a mobile phone, a smartphone, or a tablet, or a personal computer having a communication function. Examples of frequency bands of radio waves used in the antenna module 100 according to the present embodiment include radio waves in millimeter wave bands having center frequencies of 28 GHz, 39 GHz, 60 GHz, and the like, but radio waves in frequency bands other than the frequency bands, such as a band up to 300 GHz, described above are also applicable.

With reference to FIG. 1, the communication device 10 includes the antenna module 100 and a BBIC 200 configuring a base band signal processing circuit. The antenna module 100 includes an RFIC 110 that is an example of a feed circuit, an antenna device 120, and a filter device 105. The communication device 10 up-converts signals transmitted from the BBIC 200 to the antenna module 100 into radio frequency signals in the RFIC 110, and radiates the signals from the antenna device 120 with the filter device 105 interposed therebetween. In addition, the communication device 10 transmits radio frequency signals received by the antenna device 120 to the RFIC 110 with the filter device 105 interposed therebetween, down-converts the radio frequency signals, and processes the down-converted signals in the BBIC 200.

In FIG. 1, for ease of description, among a plurality of feeding elements (radiation elements) 121 constituting the antenna device 120, only configurations corresponding to four feeding elements 121 are illustrated, and configurations corresponding to the other feeding elements 121 having similar configurations are omitted. Note that although FIG. 1 illustrates an example in which the antenna device 120 is formed of a plurality of feeding elements 121 arranged in a two-dimensional array, a one-dimensional array in which a plurality of feeding elements 121 is arranged in a row may be used. In the present embodiment, the feeding element 121 is a patch antenna having a substantially square flat plate shape.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal multiplexer/demultiplexer 116, a mixer 118, and an amplifier circuit 119.

When radio frequency signals are transmitted, the switches 111A to 111D and 113A to 113D are switched to sides of the power amplifiers 112AT to 112DT, and the switch 117 is connected to a transmission-side amplifier of the amplifier circuit 119. When radio frequency signals are received, the switches 111A to 111D and 113A to 113D are switched to sides of the low-noise amplifiers 112AR to 112DR, and the switch 117 is connected to a reception-side amplifier of the amplifier circuit 119.

A signal transmitted from the BBIC 200 is amplified by the amplifier circuit 119 and then, up-converted by the mixer 118. The transmission signal that is the up-converted radio frequency signal is demultiplexed into four signals by the signal multiplexer/demultiplexer 116, and passes through four signal paths to be fed to different feeding elements 121. At this time, the directivity of the antenna device 120 can be adjusted by individually adjusting a degree of phase shift of the phase shifters 115A to 115D disposed in the respective signal paths.

Reception signals that are radio frequency signals received by the feeding elements 121 pass through four different signal paths, and are multiplexed by the signal multiplexer/demultiplexer 116. The multiplexed reception signal is down-converted by the mixer 118, amplified by the amplifier circuit 119, and transmitted to the BBIC 200.

The filter device 105 includes filters 105A to 105D. The filters 105A to 105D are connected to the switches 111A to 111D in RFIC 110, respectively. The filters 105A to 105D have a function of attenuating signals in a specific frequency band. The filters 105A to 105D may be a band pass filter, a high pass filter, a low pass filter, or a combination thereof. Radio frequency signals from the RFIC 110 pass through the filters 105A to 105D, and are supplied to the corresponding feeding elements 121.

In the case of a radio frequency signal in a millimeter wave band, when a transmission line is long, a noise component tends to be easily mixed. Thus, it is preferable to make a distance between the filter device 105 and the feeding element 121 as short as possible. That is, by causing the radio frequency signals to pass through the filter device 105 immediately before radiating the radio frequency signals from the feeding elements 121, it is possible to suppress radiation of unnecessary waves from the feeding elements. Also, by passing through the filter device 105 immediately after reception at the feeding element 121, it is possible to remove unnecessary waves included in the reception signal.

Note that although the filter device 105 and the antenna device 120 are separately illustrated in FIG. 1, in the present disclosure, as will be described later, the filter device 105 is formed inside the antenna device 120.

The RFIC 110 is formed as, for example, a one chip integrated circuit component including the above-described circuit configuration. Alternatively, devices (switches, power amplifiers, low-noise amplifiers, attenuators, and phase shifters) corresponding to the feeding elements 121 in the RFIC 110 may be formed as one chip integrated circuit component for each corresponding feeding element 121.

(Configuration of Antenna Module)

Figure 2:
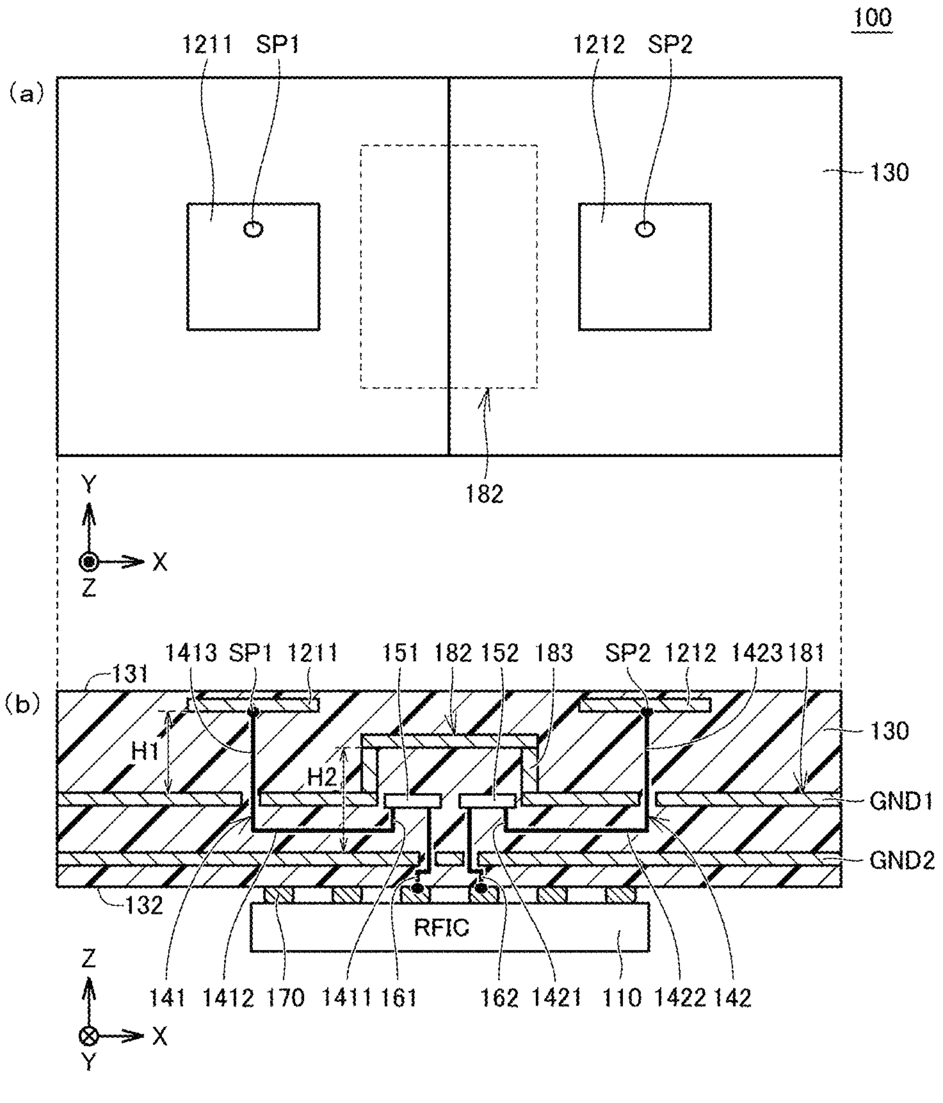
FIG. 2 is a plan view and a side perspective view of the antenna module in FIG. 1.

Next, the configuration of the antenna module 100 according to Embodiment 1 will be described in detail with reference to FIG. 2. In FIG. 2, a plan view of the antenna module 100 is illustrated in the upper part (FIG. 2(*a*)), and a side perspective view is illustrated in the lower part (FIG. 2(*b*)).

In FIG. 2, a case where the antenna module 100 is an array antenna having two feeding elements 1211 and 1212 as radiation elements will be described as an example. The antenna module includes, in addition to the feeding elements 1211 and 1212 and the RFIC 110, a dielectric substrate 130, feed wirings 141 and 142, circuits 151 and 152, connection wirings 161 and 162, and ground electrodes GND1 and GND2. Note that, in the following description, a normal direction (radiation direction of radio waves) of the dielectric substrate 130 is defined as a Z-axis direction, and a plane perpendicular to the Z-axis direction is defined as an X-axis and a Y-axis. In addition, a positive direction and a negative direction of the Z-axis in each drawing may be referred to as an upper side and a lower side, respectively.

The dielectric substrate 130 is, for example, a low temperature co-fired ceramics (LTCC) multilayer substrate, a multilayer resin substrate formed by laminating a plurality of resin layers made of resin such as epoxy or polyimide, a multilayer resin substrate formed by laminating a plurality of resin layers made of liquid crystal polymer (LCP) having a lower dielectric constant, a multilayer resin substrate formed by laminating a plurality of resin layers made of fluorine-based resin, or a ceramic multilayer substrate other than LTCC. Note that the dielectric substrate 130 does not necessarily have a multilayer structure, and may be a single-layer substrate.

The dielectric substrate 130 has a substantially rectangular shape, and the feeding elements 1211 and 1212 are disposed in a layer (layer positioned at the upper side) close to an upper surface 131 (surface in the positive direction of the Z-axis) of the dielectric substrate 130. The feeding elements 1211 and 1212 may be exposed on the surface of the dielectric substrate 130, or may be disposed inside the dielectric substrate 130 as in the example of FIG. 2. Note that in each embodiment of the present disclosure, for ease of description, a case where only a feeding element is used as a radiation element will be described as an example, but a configuration in which a non-feeding element and/or a parasitic element is disposed in addition to the feeding element may be employed.

The feeding elements 1211 and 1212 are patch antennas having a substantially square planar shape. The feeding elements 1211 and 1212 are disposed adjacent to each other along the X-axis direction of the dielectric substrate 130.

In a layer (layer positioned at the lower side) closer to a lower surface 132 (surface in the negative direction of the Z-axis) than the feeding elements 1211 and 1212 in the dielectric substrate 130, the ground electrode GND2 having a flat plate shape is disposed so as to face the feeding elements 1211 and 1212. Further, the ground electrode GND1 is disposed in a layer between the feeding elements 1211 and 1212 and the ground electrode GND2.

The RFIC 110 is mounted on the lower surface 132 of the dielectric substrate 130 with solder bumps 170 interposed therebetween. Note that the RFIC 110 may be connected to the dielectric substrate 130 by using a multipolar connector instead of the solder connection.

In the antenna module 100, in plan view from the normal direction of the dielectric substrate 130, a part of the ground electrode GND1 between the feeding element 1211 and the feeding element 1212 is disposed at an upper side closer to the radiation element than the other parts. In the following description, a portion of the ground electrode GND1 facing the radiation element is referred to as a first portion 181, and a portion disposed at an upper side than the first portion 181 is referred to as a second portion. The second portion 182 may also be referred to as a “raised portion”. The first portion 181 and the second portion 182 of the ground electrode GND1 are connected by vias 183. In the first portion 181 of the ground electrode GND1, a cavity is formed in a portion overlapping the second portion 182 in plan view.

By configuring the ground electrode GND1 as described above, a thickness of the dielectric (raised height) between the second portion 182 of the ground electrode GND1 and the ground electrode GND2 is larger than a thickness of the dielectric between the first portion 181 and the ground electrode GND2.

The circuits 151 and 152 are, for example, a circuit corresponding to the filter device 105 illustrated in FIG. 1. The circuits 151 and 152 are disposed between the second portion 182 of the ground electrode GND1 and the ground electrode GND2. In other words, in plan view of the antenna module 100, the circuits 151 and 152 overlap the second portion 182 of the ground electrode GND1 and are disposed in a layer at the lower side than the second portion 182.

Radio frequency signals are supplied from the RFIC 110 to a feeding point SP1 of the feeding element 1211 with the connection wiring 161, the circuit 151, and the feed wiring 141 interposed therebetween. The feed wiring 141 falls downward from the circuit 151 by using the via 1411, extends in a layer between the ground electrode GND1 and the ground electrode GND2 by the wiring pattern 1412, and rises to the feeding point SP1 by using the via 1413.

Further, radio frequency signals are supplied from the RFIC 110 to a feeding point SP2 of the feeding element 1212 with the connection wiring 162, the circuit 152, and the feed wiring 142 interposed therebetween. The feed wiring 142 falls downward from the circuit 152 by using the via 1421, extends in a layer between the ground electrode GND1 and the ground electrode GND2 by using the wiring pattern 1422, and rises to the feeding point SP2 by using the via 1423.

In the example of FIG. 2, the feeding point of each feeding element is arranged at a position offset from the center of the feeding element in the positive direction of the Y-axis. By disposing the feeding point at such a position, a radio wave having a polarization direction in the Y-axis direction is radiated from each feeding element.

In FIG. 2, conductors constituting the radiation elements, the electrodes, the vias, and the like are formed of metal whose main component is aluminum (Al), copper (Cu), gold (Au), silver (Ag), or an alloy thereof.

Figure 3:
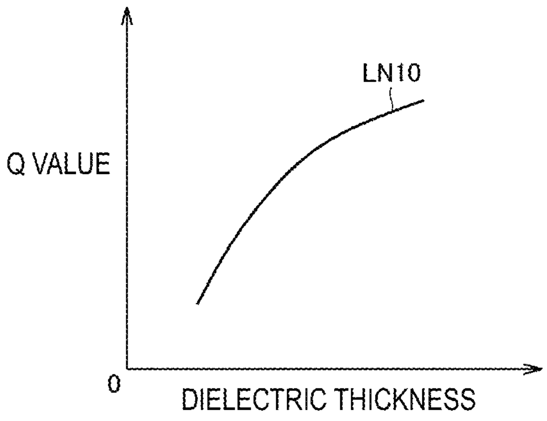
FIG. 3 is a diagram for explaining a relationship between a thickness of a dielectric and a Q value.

As described above, when filters are formed as the circuits 151 and 152, each filter may be formed as a line disposed between the ground electrodes GND1 and GND2, that is, a strip line. In the filter formed by the strip line, as illustrated in FIG. 3, it is generally known that a dielectric thickness between the ground electrodes affects a Q value. To be more specific, as indicated by a line LN10 in FIG. 3, the Q value increases as the dielectric becomes thicker. Thus, when the filter is formed as the strip line, in order to ensure a high Q value, it is desirable that the dielectric between the ground electrodes in the portion where the filter is formed (H2 in FIG. 2) be made as thick as possible.

On the other hand, in order to improve antenna characteristics such as reducing a loss of an antenna and widening a frequency band width, it is necessary to secure a dielectric thickness (H1 in FIG. 2) between the radiation element and the ground electrode to some extent. Thus, when the filter is formed in the antenna device, the influence on the antenna characteristics and a filter characteristic varies depending on how the ground electrode is arranged.

Figure 4:
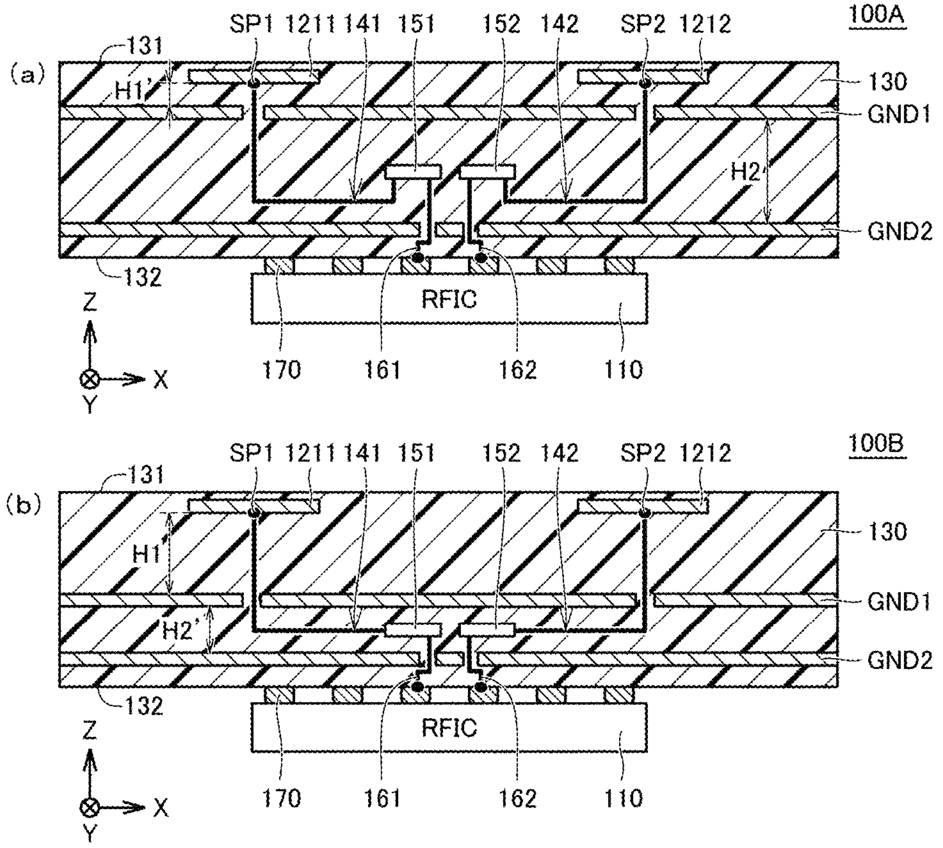
FIG. 4 is a side perspective view of an antenna module according to a comparative example.

FIG. 4 is side perspective views of the antenna modules 100A and 100B in the comparative example. In the antenna modules 100A and 100B, each ground electrode has a flat plate shape, and the overall dimension (thickness) of the dielectric substrate 130 is the same as that of the antenna module 100 illustrated in FIG. 2.

The antenna module 100A (FIG. 4(*a*)) is an example in which priority is given to a filter characteristic, and the distance between the ground electrodes GND1 and GND2 is set to H2 similar to FIG. 2. In this case, since a distance between the feeding elements 1211 and 1212 and the ground electrode GND1 is set to H1' (<H1), antenna characteristics may not be ensured.

On the other hand, the antenna module 100B (FIG. 4(*b*)) is an example in which priority is given to antenna characteristics, and the distance between the feeding elements 1211 and 1212 and the ground electrode GND1 is set to H1 similar to FIG. 2. In this case, since the distance between the ground electrodes GND1 and GND2 is set to H2' (<H2), there is a possibility that the Q value of the filter cannot be sufficiently secured.

Additionally, although not illustrated in the drawings, when the distance between the feeding elements 1211 and 1212 and the ground electrode GND1 is simply referred to as H1 and the distance between the ground electrodes GND1 and GND2 is simply referred to as H2, the antenna characteristics and the filter characteristic can be ensured, but the entire dielectric substrate 130 becomes thick. For this reason, the thickness becomes a factor that prevents thinning of the antenna device, and there may be a case where a desired dimension of the device cannot be achieved.

In the antenna module 100 according to Embodiment 1, as described with reference to FIG. 2, the portion (second portion 182) of the ground electrode GND1 between the feeding element 1211 and the feeding element 1212 is raised, and the filters (circuits 151 and 152) are disposed at the lower side of the raised portion, whereby ensuring the distance H1 between the feeding elements 1211 and 1212 and the ground electrode GND1 and ensuring the distance H2 between the ground electrodes in the portion where the filters are formed. As a result, it is possible to suppress deterioration of both the antenna characteristics and the filter characteristic while maintaining miniaturization and thinning of the entire device.

Note that it is desirable that the raised portion (second portion 182) of the ground electrode GND1 be disposed at a position having an equal distance from the two feeding elements 1211 and 1212 in consideration of symmetry of the antenna characteristics. In addition, it is desirable that the dimension (dimension in the Y-axis direction in FIG. 2) of the side of the raised portion facing each feeding element be larger than the dimension of one side of each of the feeding elements 1211 and 1212. In FIG. 2, the dimension of the raised portion in the Y-axis direction is shorter than the dimension of the dielectric substrate 130 in the Y-axis direction, but the raised portion may be formed over the entire region of the dielectric substrate 130 in the Y-axis direction.

In Embodiment 1, the "feeding element 1211" and the "feeding element 1212" respectively correspond to the "first feeding element" and the "second feeding element" in the present disclosure. Further, the "circuits 151 and 152" correspond to the "first circuit" in the present disclosure.

Note that in Embodiment 1, the case where the "first circuit" is the "filter" has been described as an example, but the "first circuit" may be a circuit other than a filter. For example, a matching circuit such as a stub, a connection circuit such as wiring, an integrated circuit in which a large number of circuits are integrated, or the like may be applied.

(Regarding Antenna Characteristics)

Effects on various antenna characteristics in the configuration of Embodiment 1 will be described with reference to FIG. 5 to FIG. 10. Note that in the following description, radio waves with 28 GHz being used as a center frequency are used as an example.

<Isolation Characteristics>

Figure 5:
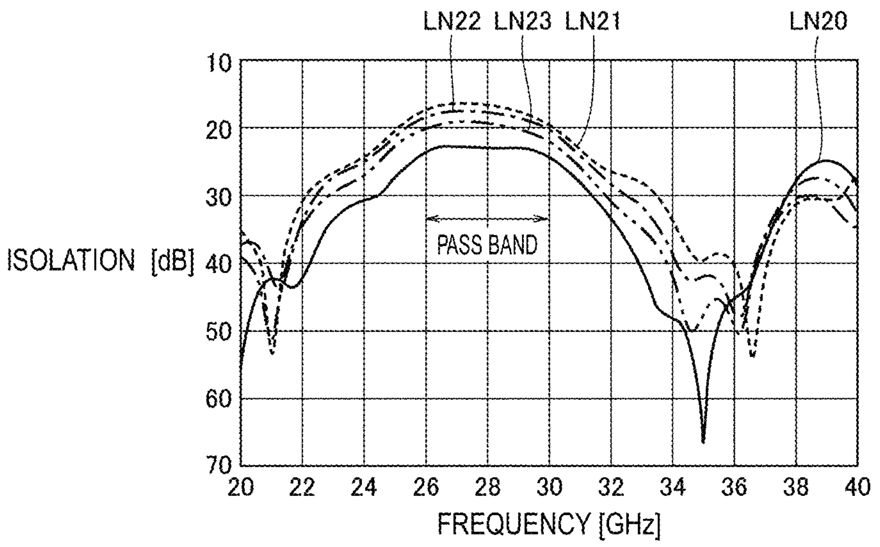
FIG. 5 is a diagram for explaining a relationship between a raised height of a ground electrode and isolation.

With reference to FIG. 5, the relationship between the raised height of the raised portion (second portion 182) of the ground electrode GND1 and the isolation between the two feeding elements 1211 and 1212 will be described. In FIG. 5, the horizontal axis represents the frequency, and the vertical axis represents the isolation between the feeding elements. In FIG. 5, a broken line LN21 indicates isolation in a case where there is no raised portion (raised height 0 mm), a dashed-dotted line LN22 indicates isolation in a case where the raised height is 0.2 mm, a dashed-two dotted line LN23 indicates isolation in a case where the raised height is 0.4 mm, and a solid line LN20 indicates isolation in a case where the raised height is 0.8 mm. As illustrated in FIG. 5, it can be seen that the isolation between the feeding elements is improved as the raised height is increased in the target frequency band around 28 GHz.

As the raised height increases, a distance between the raised portion and each of the feeding elements 1211 and 1212 decreases. Since the raised portion is disposed between the feeding element 1211 and the feeding element 1212, electric lines of force leaking from the feeding element 1211 to the feeding element 1212 are more likely to be captured by the raised portion of the ground electrode GND1 as the raised height increases. Thus, as the raised height increases, the isolation between the feeding elements can be improved.

Note that when the raised portion is positioned at the upper side than the feeding element, there is a possibility that an influence on a radio wave radiated from the feeding element may occur. For this reason, it is desirable that the raised portion be disposed in a layer in which the feeding element is disposed or in a layer positioned at the lower side than the layer.

Figure 6:
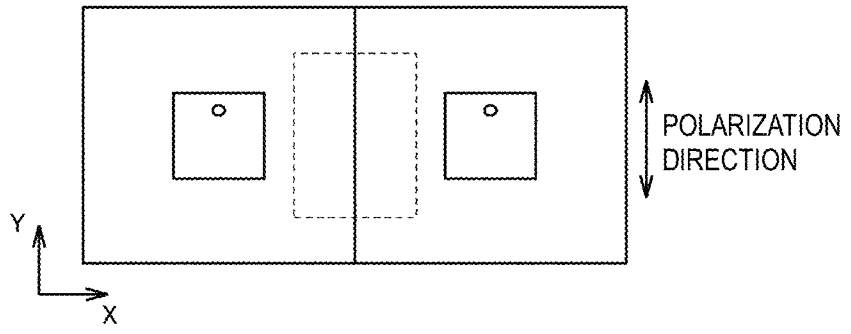
FIG. 6 is a first diagram for explaining a relationship between a polarization direction and isolation.
Figure 6:
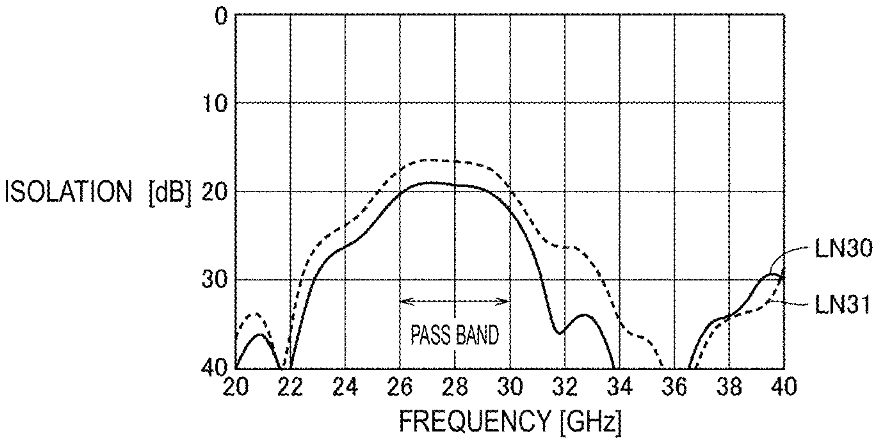

Next, with reference to FIG. 6 and FIG. 7, description will be given of a relationship between a polarization direction of a radio wave radiated from each feeding element and isolation. FIG. 6 is a diagram illustrating isolation in a case where two feeding elements are adjacent to each other in a direction (X-axis direction) perpendicular to the polarization direction (Y-axis direction), in other words, in a case where the extending direction of the raised portion and the polarization direction are the same direction, as in FIG. 2. On the other hand, FIG. 7 is a diagram illustrating isolation in a case where two feeding elements are adjacent to each other in the same direction (X-axis direction) as the polarization direction (X-axis direction), in other words, in a case where the extending direction of the raised portion and the polarization direction are orthogonal to each other.

Figure 7:
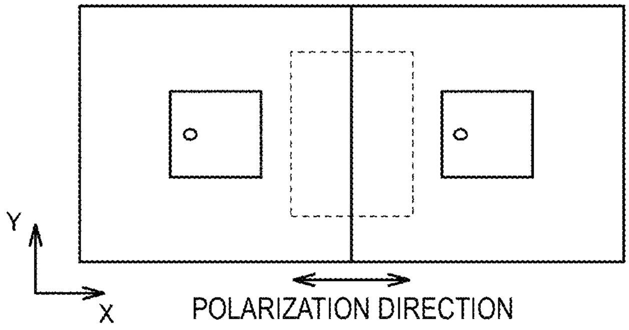
FIG. 7 is a second diagram for explaining a relationship between a polarization direction and isolation.
Figure 7:
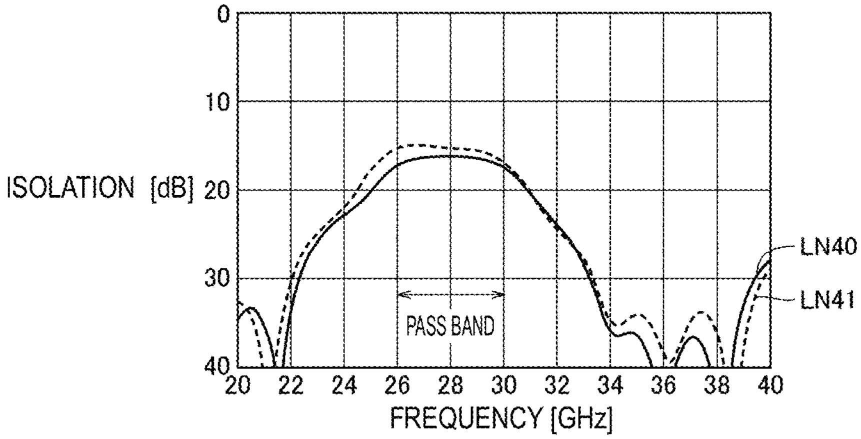

In FIG. 6 and FIG. 7, a schematic diagram of an antenna module indicating a polarization direction is illustrated in an upper part (FIG. 6(*a*) and FIG. 7(*a*)), and isolation characteristics are illustrated in a lower part (FIG. 6(*b*) and FIG. 7(*b*)). In FIG. 6 and FIG. 7, broken lines (LN31 and LN41) indicate isolation in the case where there is no raised portion, and solid lines (LN30 and LN40) indicate isolation in the case where there is a raised portion.

When FIG. 6(*b*) and FIG. 7(*b*) are compared, an effect of improving isolation is larger in the case where the feeding elements are adjacent to each other in the direction perpendicular to the polarization direction (FIG. 6). This is because current components perpendicular to the polarization direction are prevented from flowing through the surface layer of the ground electrode GND1 and flowing into the adjacent feeding element by the raised portion.

<Directivity>

Figure 8:
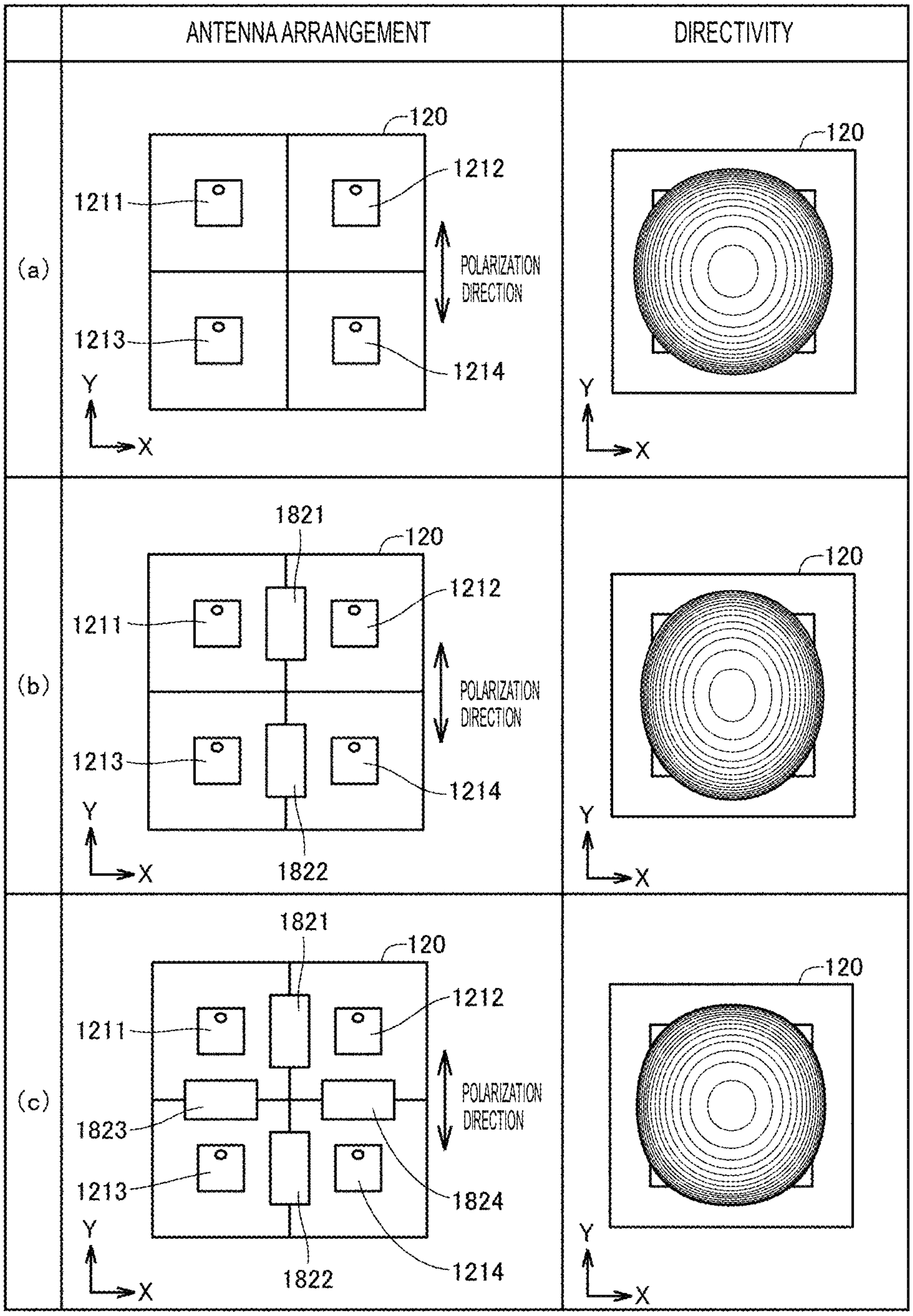
FIG. 8 is a diagram for explaining a relationship between arrangement of raised portions and directivity in a case of a 2×2 array antenna.

FIG. 8 is a diagram for explaining the relationship between the arrangement of the raised portion and the directivity in the case of an array antenna two-dimensionally arranged in a 2×2 manner. FIG. 8(*a*) at the upper part illustrates a schematic diagram of antenna arrangement in the case where the raised portion is not formed, and the directivity of the antenna. FIG. 8(*b*) at the middle part illustrates a schematic diagram of antenna arrangement and directivity in the case where the raised portions 1821 and 1822 are disposed between the feeding elements adjacent to each other in the direction perpendicular to the polarization direction (between the feeding element 1211 and the feeding element 1212 and between the feeding element 1213 and the feeding element 1214), and in addition to the case of FIG. 8(*b*), FIG. 8(*c*) at the lower part illustrates a schematic diagram of antenna arrangement and directivity in the case where the raised portions 1823 and 1824 are disposed between the feeding elements adjacent to each other in the polarization direction (between the feeding element 1211 and the feeding element 1213 and between the feeding element 1212 and the feeding element 1214). Note that it should be noted that the diagrams of the directivity represent gains of radiated radio waves by contour lines.

With reference to FIG. 8, in the case where the raised portion is not formed (FIG. 8(*a*)), the directivity is indicated by a substantially perfect circle. On the other hand, in the case of FIG. 8(*b*) in which the raised portions 1821 and 1822 are formed only between the feeding elements at the side where the effect of improving the isolation is large, the directivity is indicated by an elliptical shape elongated in the Y-axis direction in which the raised portions 1821 and 1822 extend. The symmetry of the ground electrode GND1 in the X-axis direction is lost due to the raised portion, whereby the symmetry of the directivity of each feeding element is also lost, and as a result, the symmetry of the entire array is slightly lost.

In the case of FIG. 8(*c*) in which the raised portions 1823 and 1824 are formed not only between the feeding elements adjacent to each other in the X-axis direction but also between the feeding elements adjacent to each other in the Y-axis direction, the symmetry of the ground electrode GND1 in the X-axis direction and the Y-axis direction is improved, so that the symmetry of the directivity of each feeding element is improved. Thus, as compared with the case of FIG. 8(*b*), the symmetry is improved and the directivity is indicated by a substantially perfect circle.

As described above, in the case of the two-dimensionally arranged antenna array, by arranging the raised portion in each of the polarization direction and the direction perpendicular to the polarization direction, it is possible to achieve the directivity with improved symmetry and the improvement in antenna efficiency.

Figure 9:
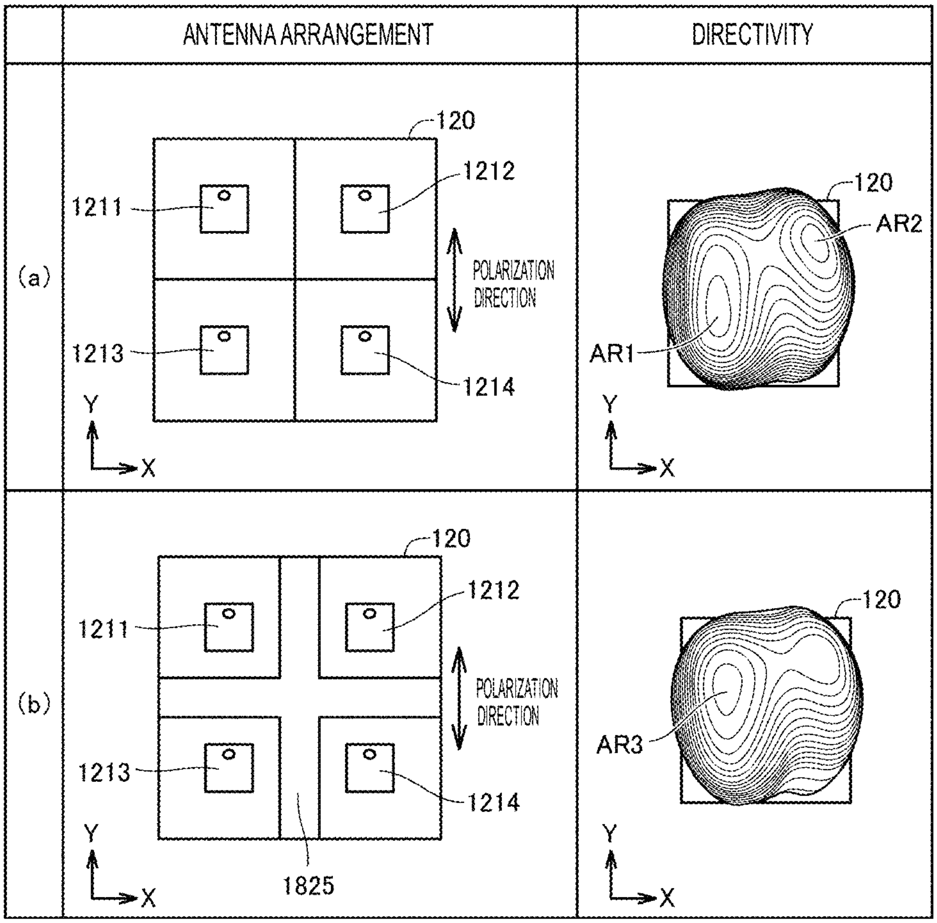
FIG. 9 is a diagram for explaining directivity when a radio wave is radiated from one radiation element in the case of the 2×2 array antenna.

FIG. 9 is a diagram illustrating the directivity when radio waves are radiated from one radiation element in a 2×2 array antenna. FIG. 9(*a*) at the upper part illustrates a case where the raised portion of the ground electrode is not provided between the feeding elements, and FIG. 9(*b*) at the lower part illustrates a case where the raised portion is provided between the feeding elements adjacent to each other in the polarization direction (Y-axis direction) and the direction perpendicular to the polarization direction (X-axis direction). Note that a raised portion 1825 in FIG. 9(*b*) is formed in a cross shape in which a raised portion extending in the X-axis direction and a raised portion extending in the Y-axis direction are connected to each other.

FIG. 9 illustrates the directivity in a state in which a radio frequency signal is supplied only to the feeding element 1211 and no radio frequency signal is supplied to the other feeding elements. Also in FIG. 9, the diagrams of the directivity represent gains of radiated radio waves by contour lines.

With reference to FIG. 9, in FIG. 9(*a*) in which the raised portion is not provided, two peaks (AR1 and AR2) are generated in the gain of the radiated radio wave. The peak AR1 occurs near the feeding element 1213 being adjacent in the polarization direction, and the peak AR2 occurs near the feeding element 1212 being adjacent in the direction perpendicular to the polarization direction.

On the other hand, in FIG. 9(*b*) in which the raised portion is provided, the gain of the peak AR2 near the feeding element 1212 decreases, and the peak AR2 near the feeding element 1213 also changes to a position (AR3) closer to the feeding element 1211. That is, depending on the arrangement of the raised portion, the peak position of the gain changes to the vicinity of the feeding element 1211 that radiates radio waves. This is to be because the isolation between the adjacent feeding elements is improved by the raised portion 1825, the radio frequency signal leaking to the feeding elements 1212 and 1213 along with the feeding to the feeding element 1211 is reduced, and thus, the gains of the radio waves radiated from the feeding elements 1212 and 1213 are suppressed.

Each of the other three feeding elements exhibits similar directivity when a radio wave is independently radiated, and exhibits the directivity as illustrated in FIG. 8 as a whole when radio waves are simultaneously radiated from the four feeding elements.

Note that in FIG. 8 and FIG. 9, the feeding elements 1211 and 1212 correspond to the “first feeding element” or the “second feeding element” in the present disclosure. When the feeding element 1211 is the “first feeding element”, the feeding element 1213 corresponds to the “third feeding element” of the present disclosure, and when the feeding element 1212 is the “first feeding element”, the feeding element 1214 corresponds to the “third feeding element” of the present disclosure.

(Modifications)

In the antenna module according to Embodiment 1, the configuration has been described in which the dielectric substrate is formed of a dielectric having a single dielectric constant. In a modification, an example of forming a dielectric substrate by using a plurality of dielectrics having different dielectric constants will be described.

When the filter is disposed in the antenna device, it is necessary to consider the antenna characteristics and the filter characteristic as described above. Here, considering the relationship between these characteristics and the dielectric constant of the dielectric substrate, it is preferable to lower the dielectric constants of the dielectric substrate in order to widen the band width of the antenna, but on the other hand, it is preferable for the filter characteristic to increase the dielectric constant in order to increase the Q value.

As described above, since the antenna characteristics and the filter characteristic may be in a trade-off relationship with respect to the dielectric constant, when the dielectric substrate is formed of a dielectric having a single dielectric constant, the dielectric constant may not necessarily be suitable for the two characteristics.

Thus, in the modification, a configuration is adopted in which a dielectric substrate is formed by combining a dielectric having a dielectric constant suitable for an antenna and a dielectric having a dielectric constant suitable for a filter, thereby improving both antenna characteristics and filter characteristic.

Figure 10:
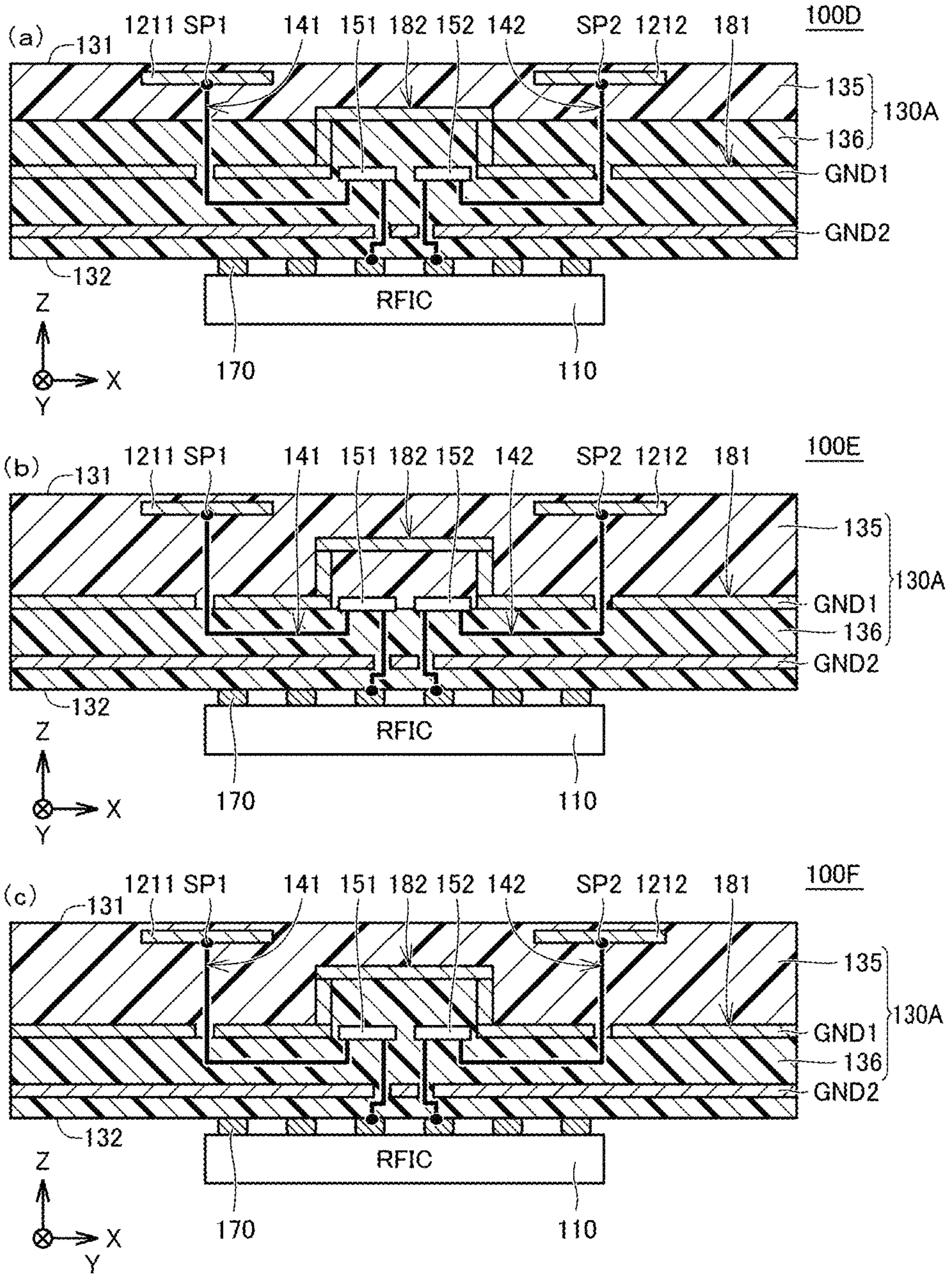
FIG. 10 is side perspective views of antenna modules according to modifications in which a dielectric substrate in which dielectrics having different dielectric constants are combined is used.

FIG. 10 is side perspective views of antenna modules 100D to 100F according to modifications. In the antenna modules 100D to 100F illustrated in FIG. 10, the dielectric substrate 130A is formed by combining a dielectric 135 having a dielectric constant suitable for an antenna and a dielectric 136 having a dielectric constant suitable for a filter. For example, a relative dielectric constant of the dielectric 135 is about 3, and a relative dielectric constant of the dielectric 136 is about 6.

In the antenna module 100D of FIG. 10(*a*), in the dielectric substrate 130A, a layer at the upper side than the second portion 182 (raised portion) of the ground electrode GND1 is formed of the dielectric 135, and a layer at the lower side than the layer where the raised portion is formed is formed of the dielectric 136. In this case, since the portion where the filter is formed (the layer between the second portion 182 and the ground electrode GND2) is formed of the dielectric 136, the dielectric substrate is configured to give priority to the filter characteristic.

On the other hand, in the antenna module 100E of FIG. 10(*b*), in the dielectric substrate 130A, a layer at the upper side than the first portion 181 of the ground electrode GND1 is formed of the dielectric 135, and a layer at the lower side than the first portion 181 is formed of the dielectric 136. In this case, the dielectric 135 and the dielectric 136 are mixed in the portion where the filter is formed, but the portion where the antenna is formed (the layer between the feeding element and the first portion 181) is formed of the dielectric 135 suitable for the antenna. That is, the antenna module 100E has the configuration of the dielectric substrate in which priority is given to the antenna characteristics.

In the antenna module 100F of FIG. 10(*c*), in the dielectric substrate 130A, a layer at the upper side than the ground electrode GND1 is formed of the dielectric 135, and a layer at the lower side than the ground electrode GND1 is formed of the dielectric 136. That is, in the layer between the feeding elements 1211 and 1212 and the first portion 181 of the ground electrode GND1, the lower side of the second portion 182 is formed of the dielectric 136, and the other portion is formed of the dielectric 135.

In the configuration of the dielectric substrate 130A in FIG. 10(*c*), since the portion where the antenna is formed is formed of the dielectric 135 suitable for the antenna and the portion where the filter is formed is formed of the dielectric 136 suitable for the filter, it is possible to optimize both the antenna characteristics and the filter characteristic.

Note that in FIGS. 10(*a*) and 10(*b*), since the layers at the same level are formed of the same dielectric, it is necessary to give priority to one of the antenna characteristics and the filter characteristic, but since the manufacturing process is relatively easy, the manufacturing cost can be reduced as compared with the case of FIG. 10(*c*). On the other hand, in the case of FIG. 10(*c*), it is necessary to form the layers at the same level with different dielectrics, so that the manufacturing process becomes slightly complicated. Of these configurations, which configuration is adopted is appropriately selected in consideration of the desired antenna characteristics, filter characteristic, and manufacturing cost.

As in the comparative example described above, by forming a dielectric substrate by combining a dielectric suitable for an antenna and a dielectric suitable for a filter, it is possible to further improve the antenna characteristics and/or the filter characteristic.

Embodiment 2

In Embodiment 2, a configuration in which an additional circuit such as a branch circuit for distributing a radio frequency signal after passing through a filter to a plurality of feeding elements or a detection circuit for monitoring power supplied to each feeding element is provided in a path between the filter and the feeding element will be described.

Figure 11:
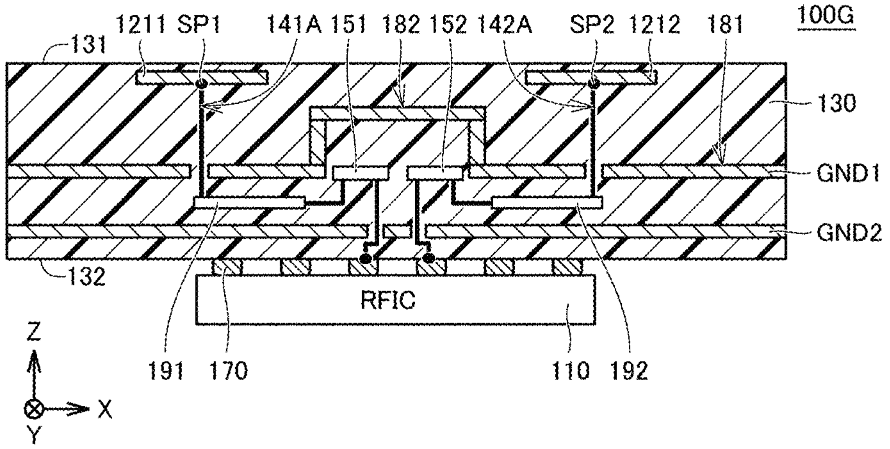
FIG. 11 is a side perspective view of an antenna module according to Embodiment 2.

FIG. 11 is a side perspective view of an antenna module 100G according to Embodiment 2. The antenna module 100G has a configuration in which circuits 191 and 192 are added to the side perspective view of the antenna module 100 illustrated in FIG. 2(*b*). In the antenna module 100G, description of elements overlapping with those of the antenna module 100 in FIG. 2 will not be repeated.

Figure 12:
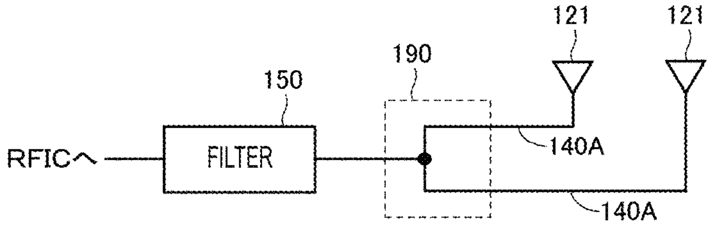
FIG. 12 is a schematic diagram of a branch circuit between feeding elements and a filter.

With reference to FIG. 11, the circuits 191 and 192 are, for example, a branch circuit 190 as illustrated in FIG. 12. In this case, the radio frequency signal having passed through the filter 150 (circuits 151 and 152) from the RFIC 110 is branched by the branch circuit 190 (circuits 191 and 192) to be supplied to the plurality of feeding elements 121 with the feed wiring 140A (feed wirings 141A and 142A) interposed therebetween. In the example of FIG. 12, the radio frequency signal is branched by the branch circuit 190 to be distributed to the two feeding elements 121, but the radio frequency signal may be distributed to three or more feeding elements.

As illustrated in FIG. 11, the branch circuit 190 (circuits 191 and 192) is disposed in a layer between the first portion 181 of the ground electrode GND1 and the ground electrode GND2. With such arrangement, the influence of the additional circuit on the filter characteristic can be reduced.

Figure 13:
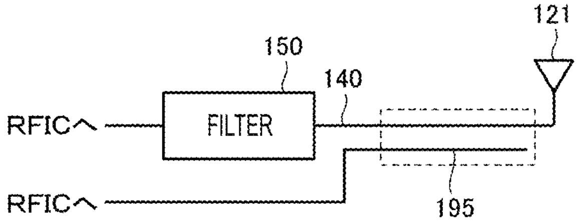
FIG. 13 is a schematic diagram of a detection circuit for monitoring electric power supplied to the feeding element.

FIG. 13 is a diagram illustrating an example of a detection circuit 195 for monitoring the power supplied to each feeding element. The detection circuit (coupler) 195 is a line disposed in parallel with the feed wiring 140 connecting the filter 150 and the feeding element 121. When the line is electromagnetically coupled to the feed wiring 140, a signal corresponding to a current (power) flowing through the feed wiring 140 is detected. The detected signal is fed back to the RFIC 110 or the BBIC 200, and output power of the radiated radio wave is adjusted by adjusting an amplifier circuit included in the RFIC 110.

Since the detection circuit 195 needs to be disposed in a path from the filter 150 to the feeding element 121, the detection circuit 195 is disposed in a layer between the first portion 181 of the ground electrode GND1 and the ground electrode GND2. This makes it possible to reduce the influence of the additional circuit on the filter characteristic.

Embodiment 3

In Embodiment 3, a case where the radiation element is a radiation element being adaptable to a dual band and the filter disposed in the antenna device is a diplexer will be described.

Figure 14:
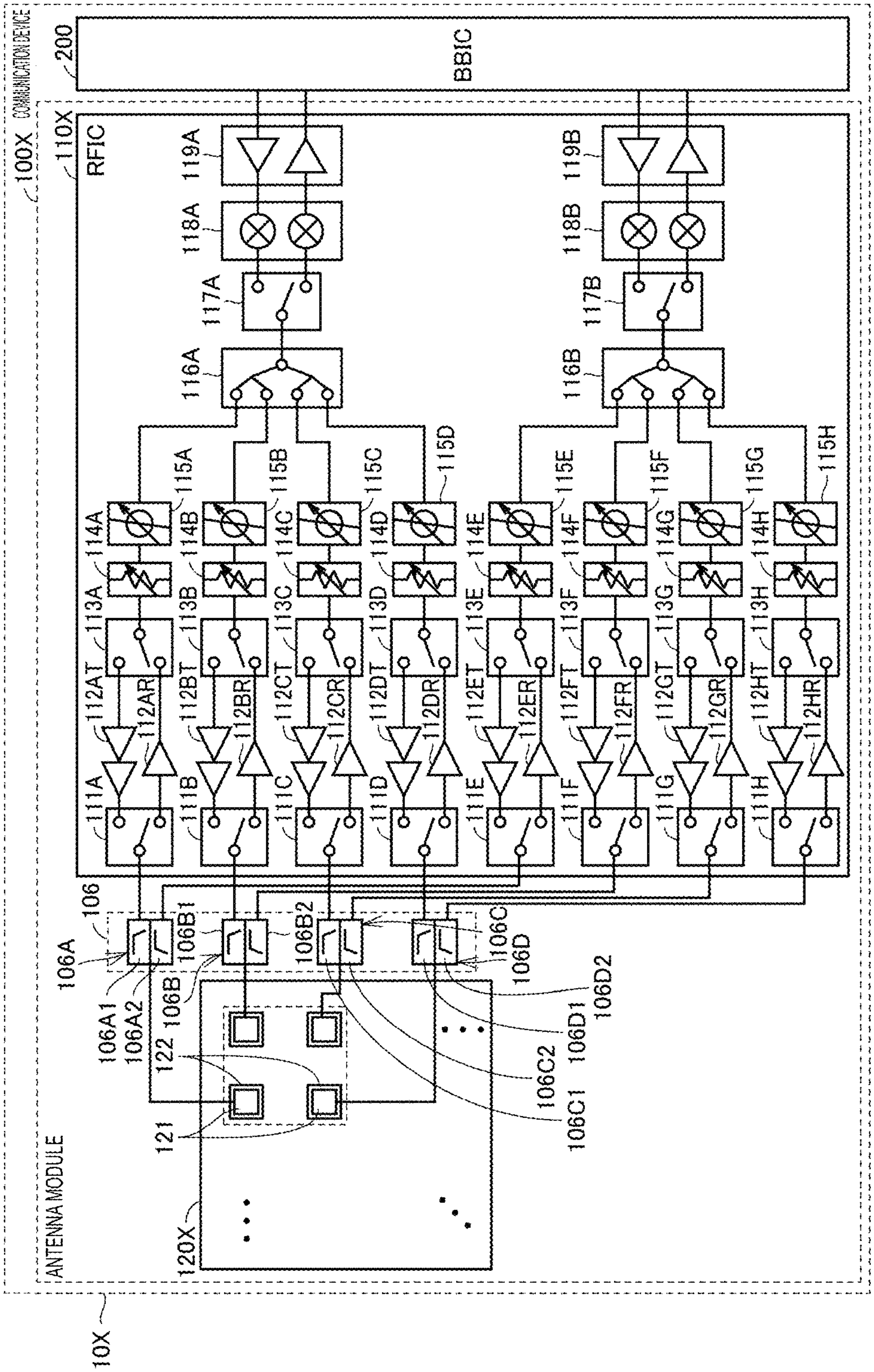
FIG. 14 is a block diagram of a communication device to which an antenna module according to Embodiment 3 is applied.

FIG. 14 is a block diagram of a communication device 10X to which an antenna module 100X according to Embodiment 3 is applied.

With reference to FIG. 14, the communication device 10X includes the antenna module 100X and the BBIC 200. The antenna module 100X includes the RFIC 110X, an antenna device 120X, and a filter device 106.

The antenna device 120X includes feeding elements 121 and non-feeding elements 122 as radiation elements. The antenna device 120X is a so-called dual-band type antenna device capable of radiating radio waves in two different frequency bands.

Figure 15:
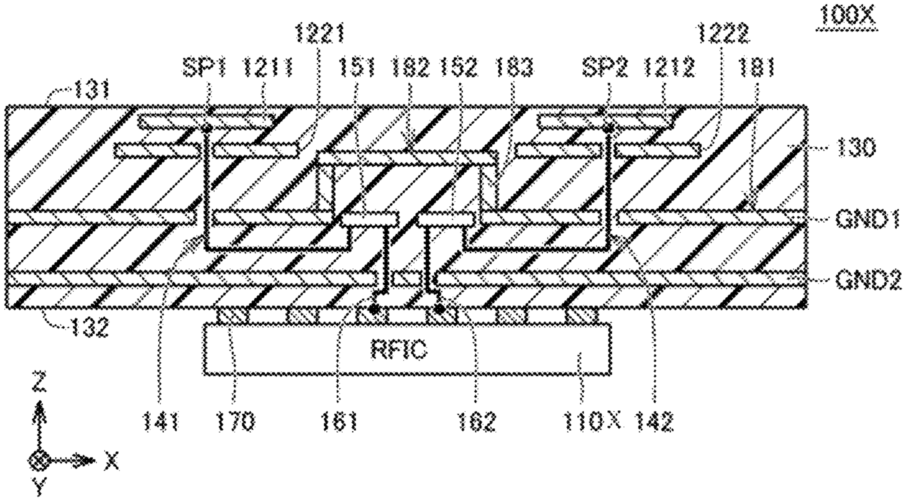
FIG. 15 is a side perspective view of the antenna module of FIG. 14.

FIG. 15 is a side perspective view of the antenna module 100X in FIG. 14. The antenna module 100X includes feeding elements 1211 and 1212 and non-feeding elements 1221 and 1222 as radiation elements. The non-feeding element 1221 is disposed in a layer between the feeding element 1211 and the ground electrode GND1 in the dielectric substrate 130. The feed wiring 141 passes through the non-feeding element 1221, and is connected to the feeding point SP1 of the feeding element 1211. Similarly, the non-feeding element 1222 is disposed in a layer between the feeding element 1212 and the ground electrode GND1 in the dielectric substrate 130. The feed wiring 142 passes through the non-feeding element 1222, and is connected to the feeding point SP2 of the feeding element 1212.

A size of the non-feeding elements 1221 and 1222 is larger than a size of the feeding elements 1211 and 1212. Thus, a resonant frequency of the non-feeding elements 1221 and 1222 is lower than a resonant frequency of the feeding elements 1211 and 1212. By supplying a radio frequency signal corresponding to the resonant frequency of the non-feeding elements 1221 and 1222 to each of the feed wirings 141 and 142, radio waves having a frequency lower than that of the feeding elements 1211 and 1212 can be radiated from the non-feeding elements 1221 and 1222.

The RFIC 110X is configured to be able to supply radio frequency signals in two frequency bands. The RFIC 110X includes switches 111A to 111H, 113A to 113H, 117A, and 117B, power amplifiers 112AT to 112HT, low-noise amplifiers 112AR to 112HR, attenuators 114A to 114H, phase shifters 115A to 115H, signal multiplexers/demultiplexers 116A and 116B, mixers 118A and 118B, and amplifier circuits 119A and 119B. Among these, the configurations of the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A are circuits for radio frequency signals in a low-frequency band. In addition, the configurations of the switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B are circuits for radio frequency signals in a high-frequency band.

In the case of transmitting radio frequency signals, the switches 111A to 111H and 113A to 113H are switched to sides of the power amplifiers 112AT to 112HT, and the switches 117A and 117B are connected to the transmission-side amplifiers of the amplifier circuits 119A and 119B. In the case of receiving radio frequency signals, the switches 111A to 111H and 113A to 113H are switched to sides of the low-noise amplifiers 112AR to 112HR, and the switches 117A and 117B are connected to the reception-side amplifiers of the amplifier circuits 119A and 119B.

The filter device 106 includes diplexers 106A to 106D. Each diplexer includes a low pass filter (filter 106A1, 106B1, 106C1, or 106D1) that passes radio frequency signals in a low-frequency band and a high pass filter (filter 106A2, 106B2, 106C2, or 106D2) that passes radio frequency signals in a high-frequency band. The filters 106A1, 106B1, 106C1, and 106D1 are respectively connected to the switches 111A to 111D in the RFIC 110X. Also, the filters 106A2, 106B2, 106C2, and 106D2 are respectively connected to the switches 111E to 111H in the RFIC 110X. Each of the diplexers 106A to 106D is connected to the corresponding feeding element 121.

Signals transmitted from the BBIC 200 are amplified by the amplifier circuits 119A and 119B and up-converted by the mixers 118A and 118B. A transmission signal that is a radio frequency signal that has been up-converted is demultiplexed into four signals by the signal multiplexer/demultiplexer 116A or 116B, and the demultiplexed signals pass through corresponding signal paths, and are fed to different feeding elements 121.

Transmission signals from the switches 111A to 111D in the RFIC 110X are radiated from the corresponding non-feeding elements 122 via the filters 106A1 to 106D1, respectively. Transmission signals from the switches 111E to 111H in the RFIC 110X are radiated from the corresponding feeding elements 121 via the filters 106A2 to 106D2, respectively.

By individually adjusting the degree of phase shift of the phase shifters 115A to 115H disposed in the respective signal paths, the directivity of the antenna device 120X can be adjusted.

Reception signals that are radio frequency signals received by the respective radiation elements (the feeding elements 121 and the non-feeding elements 122) are transmitted to the RFIC 110X with the filter device 106 interposed therebetween, and are multiplexed in the signal multiplexer/demultiplexer 116A or 116B via four different signal paths. The multiplexed reception signal is down-converted by the mixer 118A or 118B, amplified by the amplifier circuit 119A or 119B, and transmitted to the BBIC 200.

Also in such a dual-band type antenna module, as illustrated in FIG. 15, the diplexer (circuits 151 and 152) is disposed between the second portion 182 (raised portion) of the ground electrode GND1 and the ground electrode GND2, whereby the distances between the radiation elements and the ground electrode GND1 can be ensured, and the distance between the ground electrodes in the portion where the diplexer is formed can be ensured. As a result, it is possible to improve both the antenna characteristics and the filter characteristic while maintaining miniaturization and thinning of the entire device.

Embodiment 4

In the above-described embodiments, the configuration in which the filter is formed in the feed wiring extending from the RFIC to the radiation element in the antenna device has been described.

In Embodiment 4, a configuration in which a filter is formed in a path before signal demultiplexing in the RFIC will be described.

Figure 16:
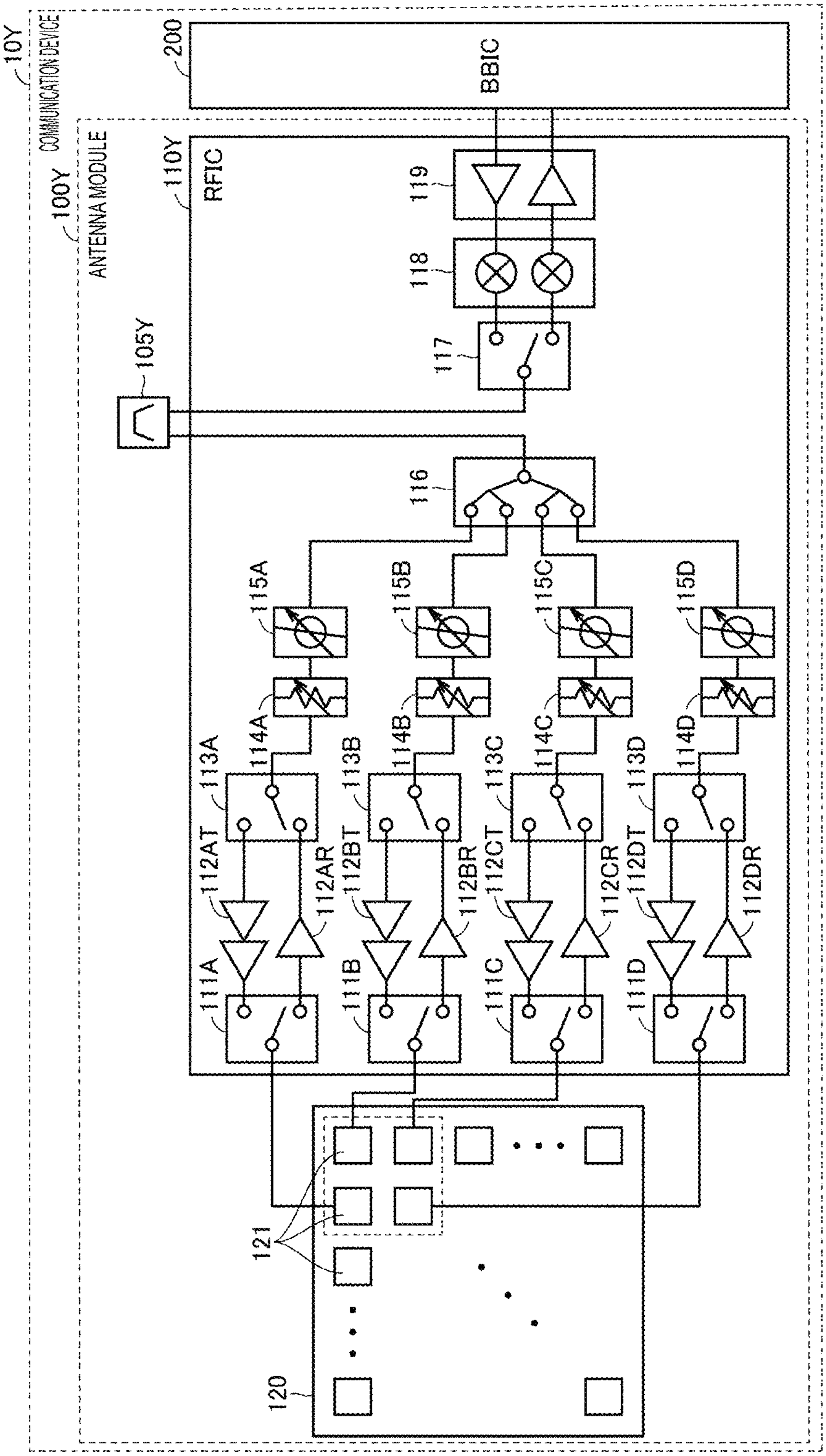
FIG. 16 is a block diagram of a communication device to which an antenna module according to Embodiment 4 is applied.

FIG. 16 is a block diagram of a communication device 10Y to which an antenna module 100Y according to Embodiment 4 is applied. With reference to FIG. 16, the communication device 10Y includes the antenna module 100Y and the BBIC 200. The antenna module 100Y includes an RFIC 110Y, an antenna device 120, and a filter device 105Y.

In the antenna module 100 of Embodiment 1 illustrated in FIG. 1, radio frequency signals from the RFIC 110 are transmitted to the antenna device 120 with the filter device 105 interposed therebetween. In the antenna module 100Y, the RFIC 110Y and the antenna device 120 are directly connected by using a feed wiring, and the filter device 105Y is connected between the signal multiplexer/demultiplexer 116 and the switch 117 in the RFIC 110Y. Note that the filter device 105Y is disposed outside the RFIC 110Y, and is specifically formed inside the antenna device 120 as will be described later with reference to FIG. 17.

Figure 17:
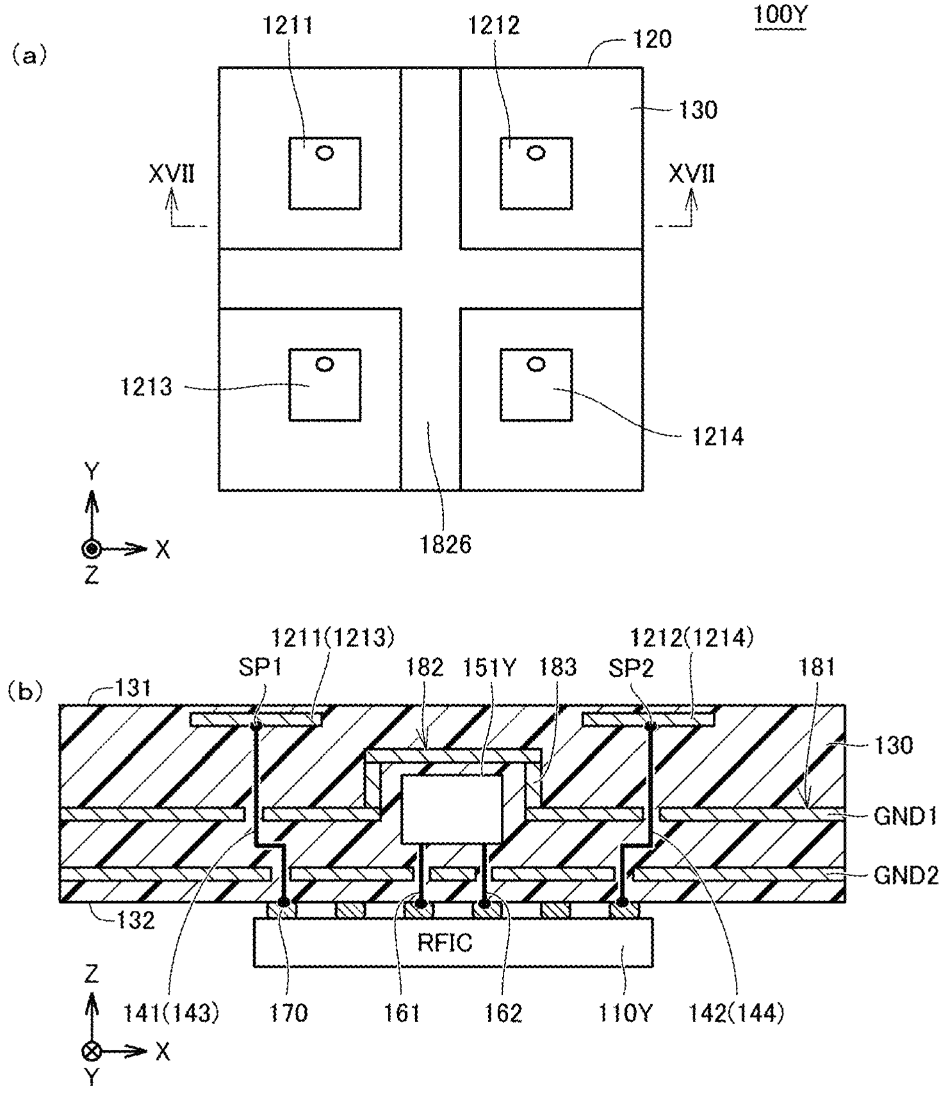
FIG. 17 is a plan view and a side perspective view of the antenna module in FIG. 16.

FIG. 17 illustrates a detailed configuration of the antenna module 100Y illustrated in FIG. 16. In FIG. 17, FIG. 17(*a*) at the upper part illustrates a plan view of the antenna module 100Y. In addition, FIG. 17(*b*) at the lower part illustrates a side perspective view seen from the line XVII-XVII in the plan view. Note that in the plan view of FIG. 17(*a*), the dielectric is omitted for ease of description.

With reference to FIG. 17, the antenna module 100Y is an antenna array in which four feeding elements 1211 to 1214 are two-dimensionally arranged in a 2×2 manner as illustrated in the plan view of FIG. 17(*a*). In the antenna module 100Y, a raised portion 1826 is provided between the feeding elements adjacent to each other in a polarization direction (Y-axis direction) and a direction perpendicular to the polarization direction (X-axis direction). The raised portion 1826 is formed in a cross shape in which a raised portion extending in the X-axis direction and a raised portion extending in the Y-axis direction are connected to each other.

As illustrated in FIG. 17(*b*), in the antenna module 100Y, the ground electrodes GND1 and GND2 are formed so as to face the feeding elements. In the ground electrode GND1 formed between the feeding element and the ground electrode GND2, the second portion 182 corresponding to the above-described raised portion 1826 is formed. Then, a circuit 151Y corresponding to the filter device 105Y illustrated in FIG. 16 is formed in a portion of the second portion 182 in the layer between the ground electrode GND1 and the ground electrode GND2.

The circuit 151Y is connected to the RFIC 110Y by using the connection wirings 161 and 162. Further, the feeding elements 1211 to 1214 are directly connected to the RFIC 110Y by using the feed wirings 141 to 144, respectively.

By disposing the filter device on a path common for four feeding elements as in the antenna module 100Y, the number of filters formed in the antenna device can be reduced, so that the size and thickness of the entire device can be further reduced.

Note that in the antenna module 100Y illustrated in FIG. 16, a configuration in which the filter device 105Y is provided instead of the filter device 105 has been described, but a configuration in which both the filter device 105 and the filter device 105Y are provided may be employed. Additionally, the "circuit 151Y" in Embodiment 4 corresponds to the "second circuit" in the present disclosure.

The embodiments disclosed herein are to be considered in all respects as illustrative and not restrictive. The scope of the present disclosure is defined not by the description of the above-described embodiments but by the claims, and is intended to include all modifications within the meaning and scope equivalent to the claims.

REFERENCE SIGNS LIST

10, 10X, 10Y COMMUNICATION DEVICE
100, 100A, 100B, 100D to 100G, 100X, 100Y ANTENNA MODULE
105, 105Y, 106 FILTER DEVICE
105A to 105D, 106A1 to 106D1, 106A2 to 106D2, 150 FILTER
106A to 106D DIPLEXER
110, 110X, 110Y RFIC
111A to 111H, 113A to 113H, 117, 117A, 117B SWITCH
112AR to 112HR LOW-NOISE AMPLIFIER
112AT to 112HT POWER AMPLIFIER
114A to 114H ATTENUATOR
115A to 115H PHASE SHIFTER
116, 116A, 116B SIGNAL MULTIPLEXER/DEMULTIPLEXER
118, 118A, 118B MIXER
119, 119A, 119B AMPLIFIER CIRCUIT
120, 120X ANTENNA DEVICE
121, 1211, 1212, 1213, 1214 FEEDING ELEMENT
122, 1221, 1222 NON-FEEDING ELEMENT/PARASITIC ELEMENT
130, 130A DIELECTRIC SUBSTRATE
131 UPPER SURFACE
132 LOWER SURFACE
135, 136 DIELECTRIC
140, 140A, 141, 141A, 142, 142A, 143, 144 FEED WIRING
1411, 1413, 1421, 1423, 183 VIA
1412, 1422 WIRING PATTERN
151, 151Y, 152, 191, 192 CIRCUIT
161, 162 CONNECTION WIRING
170 SOLDER BUMP
181 FIRST PORTION
182, 1821 to 1826 SECOND PORTION (RAISED PORTION)
190 BRANCH CIRCUIT
195 DETECTION CIRCUIT
200 BBIC
GND1, GND2 GROUND ELECTRODE
SP1, SP2 FEEDING POINT

The invention claimed is:

1. An antenna module comprising:

a radiation element including a first feeding element and a second feeding element adjacent to each other;

a first ground electrode disposed so as to face the radiation element;

a feed wiring configured to transmit a radio frequency signal from a feed circuit to the radiation element;

a first circuit connected between the feed circuit and the feed wiring; and a dielectric substrate, wherein the first ground electrode includes a first portion facing the radiation element and a second portion disposed in a layer at an upper side closer to the radiation element than the first portion, and in plan view of the antenna module from a normal direction with respect to a radiation side of the antenna module, the second portion is disposed between the first feeding element and the second feeding element, the first circuit overlaps the second portion and is disposed in a layer at a lower side than the second portion, and the antenna module is formed in or on the dielectric substrate, and the second portion is disposed entirely inside the dielectric substrate.

2. The antenna module according to claim 1, wherein a portion of the first portion that overlaps the second portion in plan view of the antenna module includes a cavity.

3. The antenna module according to claim 1, further comprising:

a second ground electrode having at least a portion thereof disposed under the first ground electrode from the plan view, wherein the first circuit is disposed between the second portion and the second ground electrode.

4. The antenna module according to claim 1, wherein the first feeding element and the second feeding element are adjacent to each other in a direction perpendicular to a polarization direction of a radio wave to be radiated from the radiation element.

5. The antenna module according to claim 4, wherein the radiation element further includes a third feeding element adjacent to the first feeding element in the polarization direction, and the second portion is also formed between the first feeding element and the third feeding element.

6. The antenna module according to claim 5, wherein a second portion formed between the first feeding element and the second feeding element, and a second portion formed between the first feeding element and the third feeding element are connected to each other.

7. The antenna module according to claim 1, wherein the second portion is disposed in a same layer as the radiation element.

8. The antenna module according to claim 1, wherein the second portion is disposed in a layer between the radiation element and the first portion.

9. The antenna module according to claim 1, wherein the first circuit includes at least one of a filter circuit, a matching circuit, a connection circuit, and an integrated circuit.

10. The antenna module according to claim 1, further comprising:

a branch circuit configured to distribute a radio frequency signal having passed through the first circuit to a plurality of feeding elements, wherein the branch circuit is disposed in a layer deeper in the antenna module than the first portion from the plan view.

11. The antenna module according to claim 1, further comprising:

a detection circuit configured to monitor radio frequency power supplied to the first feeding element and the second feeding element of the radiation element, wherein the detection circuit is disposed in a layer deeper in the antenna module than the first portion from the plan view.

12. The antenna module according to claim 1, wherein in the dielectric substrate, a layer disposed above, from perspective of the plan view, the first ground electrode is formed of a first dielectric, and a layer disposed below, from perspective of the plan view, the first ground electrode from perspective of the plan view is formed of a second dielectric having a dielectric constant different from a dielectric constant of the first dielectric.

13. The antenna module according to claim 1, wherein in the dielectric substrate, a layer above the first portion, from the plan view, is formed of a first dielectric, and a layer below, from the plan view, the first portion is formed of a second dielectric having a dielectric constant different from a dielectric constant of the first dielectric.

14. The antenna module according to claim 1, wherein in the dielectric substrate, a layer above, from perspective of the plan view, the second portion is formed of a first dielectric, and a layer below, from perspective of the plan view, the second portion is formed of a second dielectric having a dielectric constant different from a dielectric constant of the first dielectric.

15. The antenna module according to claim 1, further comprising:

the feed circuit.

16. The antenna module according to claim 1, further comprising:

the feed circuit.

17. A communication device comprising:

the antenna module according to claim 1.

18. The communication device of claim 17, further comprising:

a base band processing circuit that provides baseband signals that are upconverted, amplified and transmitted via the antenna module, and that accepts as input a baseband signal from the antenna module that the antenna module received as an RF signal and down converted to the baseband signal.

19. An antenna module comprising:

a radiation element including a first feeding element and a second feeding element adjacent to each other;

a ground electrode disposed so as to face the radiation element;

a second circuit connected to a feed circuit configured to supply a radio frequency signal to the radiation element; and a dielectric substrate, wherein the ground electrode includes a first portion facing the radiation element and a second portion disposed in a layer at an upper side closer to the radiation element than the first portion, and in plan view of the antenna module from a normal direction with respect to a radiation side of the antenna module, the second portion is disposed between the first feeding element and the second feeding element, the second circuit overlaps the second portion and is disposed in a layer at a lower side than the second portion, and the antenna module is formed in or on the dielectric substrate, and the second portion is disposed entirely inside the dielectric substrate.

20. A communication device comprising:

the antenna module according to claim 19.

* * * * *